T. B. ROGERS.
BREEDING CHICKEN-COOPS.
No. 178,332. Patented June 6, 1876.
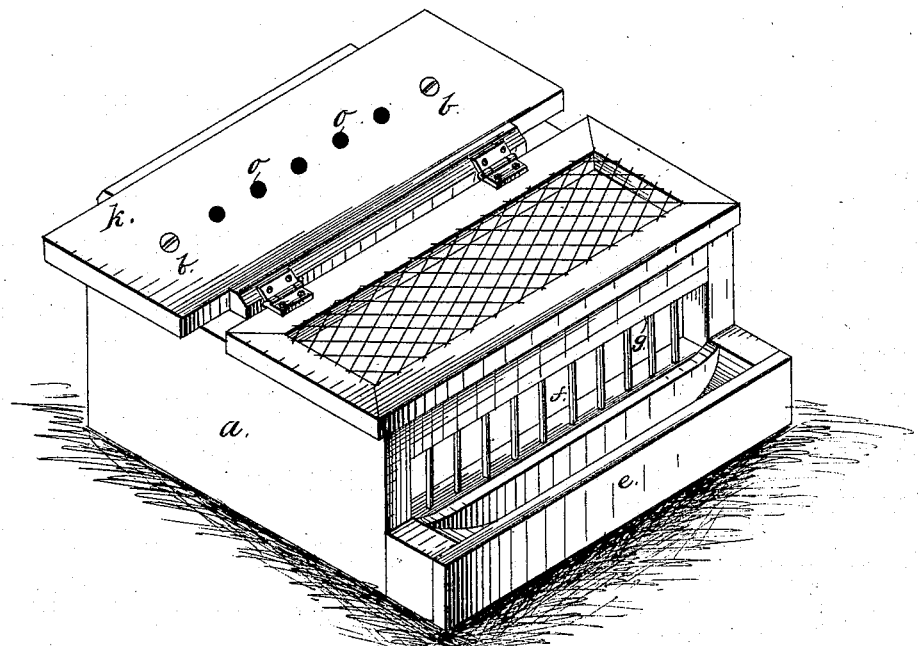
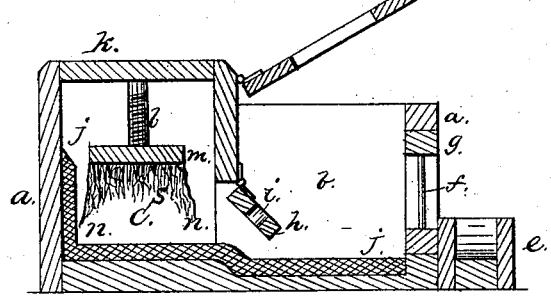
Witnesses:
Rob't F. Gaylord
Allen W. Page
Inventor,
Theodore B. Rogers
By W. E. Simonds
Att'y

UNITED STATES PATENT OFFICE.

THEODORE B. ROGERS, OF WETHERSFIELD, CONNECTICUT.

IMPROVEMENT IN BREEDING CHICKEN COOPS.

Specification forming part of Letters Patent No. 178,332, dated June 6, 1876; application filed April 5, 1876.

*To all whom it may concern:*

Be it known that I, THEODORE B. ROGERS, of Wethersfield, in the county of Hartford and State of Connecticut, have invented certain new and useful Improvements pertaining to a Breeding-Coop for Young Poultry, of which the following is a specification, reference being had to the accompanying drawings, where—

Figure 1 is a view of the whole of the coop closed. Fig. 2 is a view of the coop in central vertical section from front to rear.

Every breeder of chickens and other poultry has found that the young are peculiarly liable to the depredations of rats and other rodents, and that many of the young are lost through inclement weather. Not only so, but the services of the mother, both as a breeder and an egg-producer, are lost while she is engaged in raising a brood. I have long known that if any method could be devised of safely separating the very young poultry from the mother soon after hatching, and raising them for a time in some inclosure safe from predatory enemies and inclement weather, the profits of poultry - breeders would be greatly increased.

I know by actual experience that the coop herein shown and described will enable poultry-breeders to attain said desired end.

The coop-case $a$ has within two compartments, $b$ and $c$, the former a light chamber, wherein the chickens exercise and take their food, and the latter a dark chamber, wherein they gather and brood. The light chamber has a cover or door, $d$, preferably on the top. The top of this chamber should be transparent, of glass or lattice-work, to admit light freely. I prefer it of lattice-work, that it may admit air as well. The feeding-trough $e$ is outside of the coop-case, and the chickens have access to it through the rack $f$. This is set in a frame, $g$, and is removable, that a rack with wider interspaces may be substituted as the chickens grow older and larger. Placing the feed-trough outside the coop-case makes it easy of access for replenishing the food, and prevents the young chickens from fouling it or scattering it on the floor of the chamber.

From the light chamber a door, $h$, which may be closed, leads into the dark chamber, and in it are orifices $i$ for ventilation, and to permit the chickens to pass out when they desire exercise or food. The walls of the dark chamber and the floor are covered with a padding, $j$, to keep the chickens warm and comfortable. From the cover $k$ of the dark chamber depends, by means of the screws $l\ l$, a frame or light block, $m$, covered underneath with lamb's-wool or the like, $s$, the whole forming a brooding-pad to rest on the young chickens, and feel to them like the pressure of the mother, and the curtains $n$ depending from the sides and ends of the brooding-pad assist this effect.

The brooding-pad is not rigidly attached to the cover $k$, but it and the screws can rise as the growing height of the chickens requires. By means of the screws the depth to which the brooding-pad can descend is regulated.

Ventilation of the dark chamber is secured by air entering at the orifices $i$, or under the door $h$, which, becoming heated, rises around the brooding-pad and escapes through the orifices $o$. This method of ventilation prevents the entrance of light, and also prevents drafts of air.

I claim as my invention—

1. The coop-case $a$, containing the chamber $b$ with a transparent roof, and the padded dark chamber $c$ with the door $h$ between, all substantially as described, and for the purpose set forth.

2. The padded dark chamber $c$, containing the free-rising brooding-pad $s$, suspended by adjusting-screws $l$ from the cover thereof, all substantially as described, and for the purpose set forth.

3. The dark chamber $c$, the door $h$, provided with orifices $i$, the brooding-pad $s$, and the cover $k$, with its centrally-located ventilating-orifices $o$, all arranged substantially as described.

4. The light chamber $b$, provided with a transparent top, with the feed-rack $f$, the feed-trough $e$, the door $h$, the padded dark chamber $c$, and the free-rising brooding-pad $s$, all arranged substantially as described.

THEODORE B. ROGERS.

Witnesses:
WM. E. SIMONDS,
ROBT. F. GAYLORD.